United States Patent [19]

Torii et al.

[11] 4,389,639
[45] Jun. 21, 1983

[54] VOICE WARNING DEVICE USING ENTERTAINMENT SPEAKER

[75] Inventors: Taketsugu Torii, Kasugai; Hisatoshi Oota; Hiroshi Arai, both of Toyota, all of Japan

[73] Assignee: Toyota Jidosha Kogyo Kabushiki Kaisha, Aichi, Japan

[21] Appl. No.: 204,059

[22] Filed: Nov. 4, 1980

[30] Foreign Application Priority Data

Apr. 23, 1980 [JP] Japan .................................. 55-54804

[51] Int. Cl.³ .................. G08B 25/02; H04M 1/00
[52] U.S. Cl. .................................. 340/539; 340/531;
340/52 F; 340/692; 340/870.09; 179/1 GJ;
179/1 SM; 179/1 VE; 179/1 SW; 455/137;
455/149; 455/227
[58] Field of Search ................. 340/539, 521, 522, 533,
340/523, 511, 534, 573, 692, 52 F, 531, 52 R,
506, 526, 870.09, 384 E, 384 R, 326, 327, 328;
179/1 B, 1 GH, 1 GJ, 1 GA, 1 MN, 1 SM, 1
SW, 1 VC, 1 VE, 2 B, 5 R, 5 P; 455/227, 229,
137, 149, 152

[56] References Cited

U.S. PATENT DOCUMENTS

| 3,098,975 | 7/1963 | Schneiderman | 455/227 |
| 3,870,818 | 3/1975 | Barton et al. | 340/52 F |
| 3,876,940 | 4/1975 | Wickord et al. | 340/33 |
| 4,006,447 | 2/1977 | Narbaits-Jaureguy et al. | 340/33 |
| 4,107,464 | 8/1978 | Lynch et al. | 340/692 |

Primary Examiner—John W. Caldwell, Sr.
Assistant Examiner—Donnie L. Crosland
Attorney, Agent, or Firm—Stevens, Davis, Miller & Mosher

[57] ABSTRACT

A device for producing a voice warning over a speaker which is also used with an entertainment sound production system such as a radio or cassette recorder. The voice warning device incorporates a switching device in the circuit between the speaker and a source of entertainment sound-bearing electric signals, and also incorporates a mechanism for selectively generating electric signals representing human voice sounds for conveying warnings. When a warning signal is being generated, the switching device is switched over from its state where it connects the speaker to the entertainment sound-bearing electric signals to its state where it connects the speaker to the warning signals. Optionally, several different speakers of an entertainment system may be selectively connected to said warning signals by several switching devices.

3 Claims, 3 Drawing Figures

VOICE WARNING DEVICE USING ENTERTAINMENT SPEAKER

BACKGROUND OF THE INVENTION

The present invention relates to a voice warning device, and more particularly relates to a voice warning device adapted to be fitted to a driver's compartment which is also provided with an entertainment sound production system which comprises a plurality of speakers.

In most modern automobiles or other means of transportation it is customary for an entertainment sound system to be fitted within the compartment in which the driver or pilot is seated, in order to entertain the driver or pilot and the passengers, and thereby to improve the comfort and the drivability of the automobile or the like by relieving the mental fatigue of the occupants. Such an entertainment sound system produces its output sound through one or a plurality of speakers. Further, in the case of a high quality entertainment sound production system, invariably it utilizes at least two speakers, in order to provide a stereo effect and a good distribution of sound within the air volume of the driver and passenger compartment.

Further, in almost all automobiles or other high quality transportation means there are provided various warning devices for indicating to the driver or pilot and/or the occupants of the facility the presence of various problem conditions in the operating conditions of the facility. For instance, such warning devices may indicate to the driver of the automobile that engine oil pressure is low, that one or more doors of the automobile are not properly closed, that fuel level of the fuel tank of the automobile is low, that an oil filter of the automobile requires to be changed, or the like. Such a warning device may either convey a signal to the driver by means of a warning light or a warning sound.

In the past, such warning sounds which have been used to indicate problem conditions to the driver have been simple mechanical sounds, such as those produced by buzzers or bells. Such warning sounds are easily discernible to the driver, even if he is operating the entertainment sound production system at a fairly high level, because the warning sounds are quite unlike the typical sounds emitted by such an entertainment system.

However, recently there have been developed various so-called voice warning devices, which produce voice warnings to the driver in a simulated or synthesized human voice, specifically indicating various problem conditions. In other words, such a voice warning device emits a sequence of words precisely specifying the condition to be warned about. Difficulties and problems have arisen with such voice warning devices for several reasons. Such prior art voice warning devices have utilized their own special independent speakers. However, it has been found that the interrupting capability of such a voice warning device, when the driver is listening to sounds produced by an entertainment sound production system, has been much lower than that of the sounds emitted by buzzers or bells. The reason for this is considered to be that, when the driver's listening attention is being directed to entertainment sound sources which despatch a series of sounds which produce a continually changing mental reaction in the brain of the driver, the verbal sound from the voice warning device, which itself is not of a warning nature, and yet which must be attended to from the very beginning for its meaning to be correctly understood, cannot immediately divert the driver's listening attention from the entertainment sound sources to the warning voice signal source, with the entertainment sound sources continuing to despatch the entertainment sounds. Further, when the voice warning device has its own independent speakers, the cost has been rather high, and also space has been required for fitting such independent speakers.

SUMMARY OF THE INVENTION

Accordingly, an object of the present invention is to provide an improved voice warning device, which eliminates these problems associated with providing a voice warning device in a driver's compartment which is also equipped with an entertainment sound production system, and which is capable of positively conveying its voice warning to the driver, even when the entertainment sound production system is being operated at a fairly high level.

A further object of the present invention is to provide such an improved voice warning device which is cheaper and simpler to make than prior art systems.

A further object of the present invention is to provide such a voice warning device which is easier to fit to the automobile or other means of transportation and which requires less space.

A yet further object of the present invention is to provide an improved voice warning device for a driver's compartment with an entertainment sound production system which is provided with a plurality of speakers, which is capable of graduating the intensity and urgency of the warnings provided thereby, according to the importance of the problem condition giving rise to the warning.

According to the present invention, these and other objects are attained by, for a driver's compartment equipped with an entertainment sound-bearing production system comprising a plurality of speakers, an entertainment sound electric signal production device and a plurality of electrical connections for conducting entertainment sound-bearing electric signals from the entertainment sound electric signal production device to said speakers; a voice warning device, comprising: a switching device provided in a certain one of said electrical connections between one of said speakers and said entertainment sound-bearing electric signal production device; and a warning voice sound electric signal production device, for selectively generating electric signals representing human voice sounds for conveying a warning; the switching device, when said warning voice sound-bearing electric signal production device is not generating electric signals, being switched so as to be able to transmit entertainment sound electric signals from said entertainment sound-bearing electric signal production device to said one speaker; but, when said warning voice sound electric signal production device is generating electric signals, being switched so as not to be able to transmit entertainment sound-bearing electric signals from said entertainment sound-bearing electric signal production device, but so as to transmit said warning voice sound-bearing electric signals from said warning voice sound-bearing electric signal production device, to said speaker; whereby said one speaker is generally used for producing entertainment sound signals, but is stopped from producing entertainment sound signals and is used for producing warning voice sound signals, when said warning voice sound signals are being generated by said warning voice sound electric signal production device.

It is to be expected that an automobile or other means of transportation which is luxurious enough to be equipped with a voice warning device will, as a matter of course, be provided with an entertainment sound production system which is sterophonic, and which therefore incorporates a plurality of speakers. In such a case, when the entertainment sound production system is being operated, when one of the speakers is stopped from producing its entertainment sound signal, whether this be a musical signal or a voice signal or a combination of the two, and instead is supplied with a voice warning signal, because the voice warning signal will emanate from the same speaker as did the entertainment sound signal and to which the driver's listening attention is being directed, the driver will tend to detect the production of this warning signal much more clearly than if it had been provided from a separate speaker. Thus, the risk of his missing the warning is substantially reduced. This is due to particular characteristics of the human brain. Further, it goes without saying, that by the fact that the voice warning device according to the present invention utilizes one or more of the speakers which are also used by the entertainment sound production system, the cost of this voice warning device is substantially reduced, and its fittability to the driver's compartment is also increased.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENTS

A first preferred embodiment of the present invention will now be described, with reference to FIG. 1.

Figure 1:
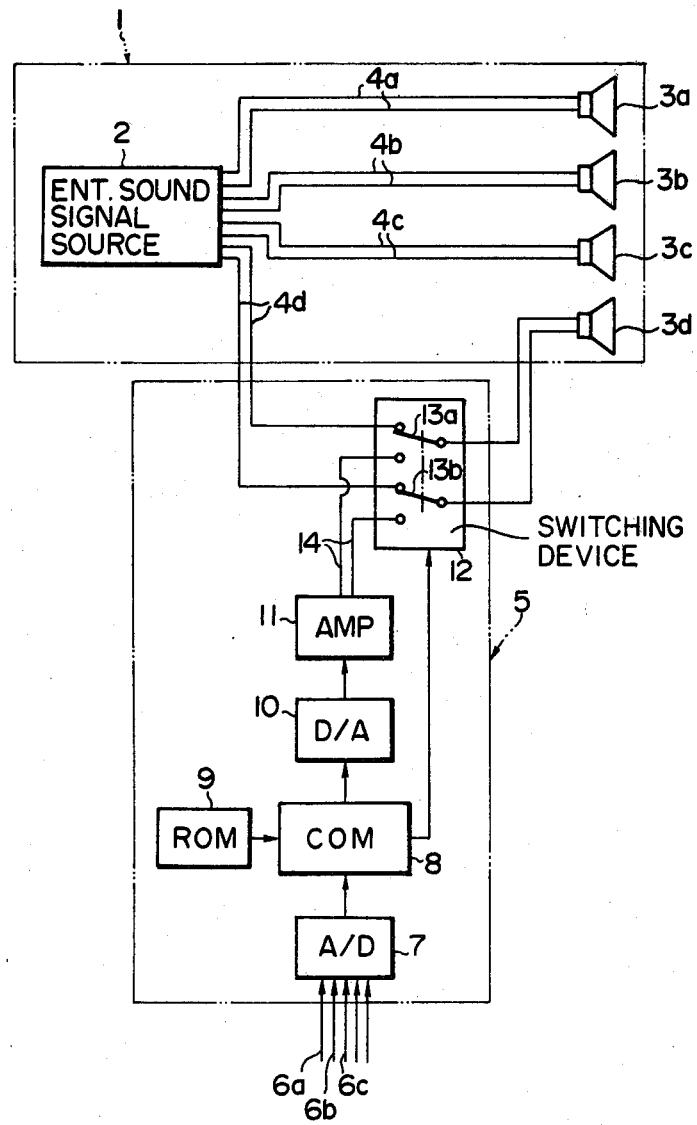
FIG. 1 is a schematic block diagram, showing both an entertainment sound production system, mounted in an automobile, which comprises a plurality of speakers, and also showing a voice warning device which is a first preferred embodiment of the present invention, and which is connected so as to interrupt production of entertainment sounds from a single one of these speakers.

In FIG. 1, there is shown a per se conventional entertainment sound production system, mounted in an automobile, which is combined with a voice warning device which is a first preferred embodiment of the present invention. The entertainment sound production system 1 comprises an entertainment sound signal source 2 which produces electrical signals representing sounds for entertaining the driver of an automobile to which the system is fitted, and, for example, may be a stereo cassette tape deck and amplifier, a radio, an eight track tape player, or the like, and in the shown embodiment in fact is a "quad" tape playing system which produces four independent channels of music or the like. These four independent channels of entertainment sound are sent via four pairs of wires 4a, 4b, 4c, and 4d to four speakers 3a, 3b, 3c, and 3d respectively. Of course, one of each of the pairs of wires 4a, etc., could be the earth of the automobile.

A voice warning device 5 is provided to be combined with the entertainment sound production system 1. To the voice warning device 5 are supplied various electrical signals through a plurality of wires 6a, 6b, 6c, etc. These signals are signals indicating various operational conditions of the automobile which must be monitored, and with regard to which it is desired to provide voice warning signals, if their values are incorrect. For example, these signals may indicate the condition of the parking brake of the automobile, the closed or non-closed condition of the various doors of the automobile, the ON/OFF condition of the headlights of the automobile, and the like.

The analog signals transmitted by the wires 6a, 6b, 6c, etc. are fed to an interface A/D converter 7 within the voice warning device 5, and are therein converted into digital signals, and may in some embodiments be multiplexed. These digital signals representing the various operational conditions of the automobile are then fed to a microcomputer 8. The microcomputer 8 operates according to a stored program of a nature which will be clear to one skilled in the art, based upon the present descriptions. The microcomputer 8 reads, as required, data stored in a read only memory (ROM) 9. This data represents, preferably in encoded form, various combinations of voice sounds, such as vowels, consonants, syllables, or the like, which are to be used for indicating to the driver of the automobile that certain problem conditions are present in the current operating conditions of the automobile. The selection of these various voice signal data is made by the microcomputer 8, according to the program stored therein, based upon the inputs received by the microcomputer 8 from the interface A/D converter 7.

When the microcomputer 8 detects that a particular problem condition is present in the current operating conditions of the automobile, based upon the inputs that it receives from the interface A/D converter 7, then, under the control of its stored program, the microcomputer 8 selects various data from the ROM 9, and produces an output signal directly representing voice sounds which convey to the driver of the automobile a warning corresponding to the actual problem condition. For example, if, based upon the inputs along the wires 6a and 6b, and converted to digital signals by the interface A/D converter 7, the microcomputer 8 decides that the parking brake of the vehicle is set in the ON condition, and that the vehicle is about to be driven away from rest, then the microcomputer 8 may select from the ROM 9 signals representing various consonant and vowel sounds and may synthesize from these stored signals an output signal which means "parking brake on", and outputs this output signal. This output signal is sent to an output D/A converter 10, which converts it into an analog output signal which, again, is directly representative of the warning message required. This analog output signal is then fed to an amplifier 11, which amplifies it to a level which is suitable for feeding to a speaker. The microcomputer 8, at the same time as it commences to output this output signal to the output D/A converter 10, also simultaneously outputs a control signal to the switching device 12. This control signal switches over the switching members 13a and 13b of the switching device 12 from the condition, shown in FIG. 1 as upward, wherein they connect one of the output channels of the entertainment sound signal source 2 to the speaker 3d, to their downward condition in FIG. 1, where they disconnect this channel of the entertainment sound signal source 2 from the speaker 3d, and connect the voice warning signal output wires 14 to the speaker 3d. Accordingly, the output signal produced by the amplifier 11 is fed via the voice warning signal output wires 14 and the switching device 12 to the speaker 3d. Thus, production of the entertainment sound signal from the speaker 3d is temporarily suspended, while the entertainment sound signals from the other three speakers, 3a, 3b, and 3c continues, and the speaker 3d instead produces the voice warning signal indicating to the driver, in the above example, that the parking brake of the automobile has improperly been left set.

On the other hand, when the voice warning message has been completely produced by the microcomputer 8, and no remaining sounds are required to be output, then the microcomputer 8 changes over the switching condition of the switching device 12, so that now the switching members 13a and 13b thereof are again set to their upward condition shown in FIG. 1, where they connect the entertainment sound signal source 2 to the speaker 3d, and accordingly production of entertainment sound is resumed. Of course, in the case of a signal indicating a very serious problem condition in the present operating condition of the automobile, it is possible for the microcomputer 8 repeatedly to output the voice warning signal, and accordingly not to switch back the switching device 12 to the entertainment producing mode for the speaker 3d.

Figure 2:
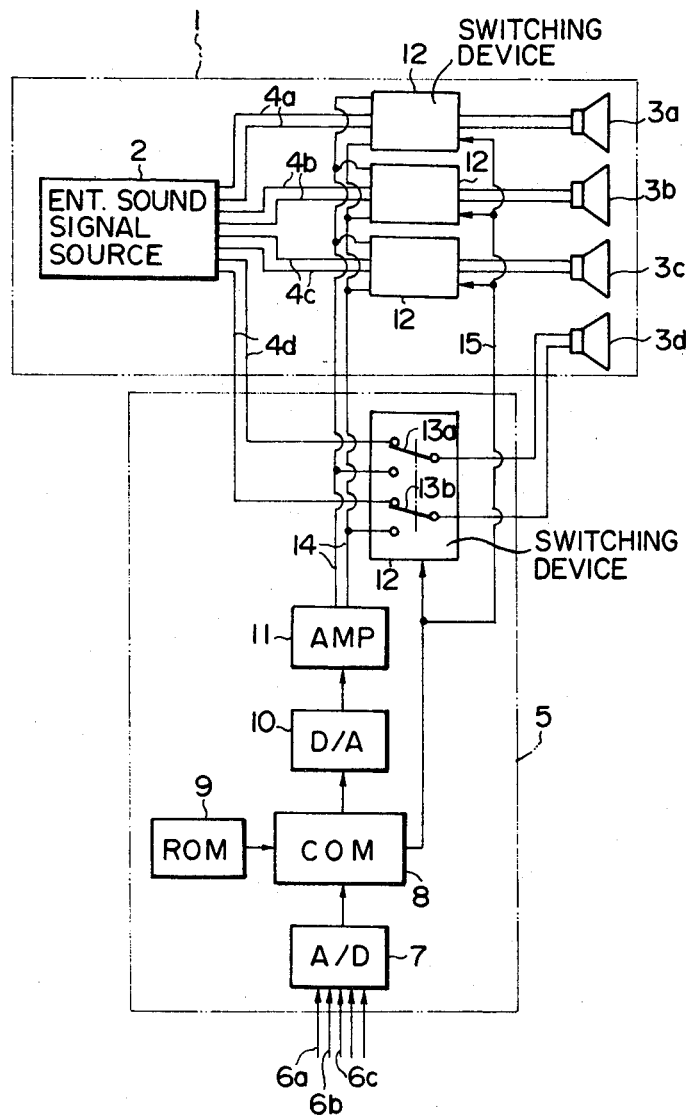
FIG. 2 is a view similar to FIG. 1, showing a voice warning device which is a second preferred embodiment of the present invention, which interrupts all of the four speakers of an entertainment sound production system simultaneously.

In FIG. 2 a second preferred embodiment of the voice warning device according to the present invention is shown. The general construction of this voice warning device is similar to that of the first preferred embodiment shown in FIG. 1, except that four switching devices 12 are provided, one in each of the pairs of wires 4a, 4b, 4c, and 4d leading respectively to the speakers 3a, 3b, 3c, and 3d. The control signal from the microcomputer 8 is fed simultaneously to all of the four switching devices 12, in order to control them all simultaneously; and, further, the output signal from the amplifier 11 is fed, via the voice warning signal output wires 14, to all of the switching devices 12. All of the switching devices 12 have a similar structure, which is shown only for the lowermost one of them in FIG. 2. It will be easily understood by one skilled in the art, based upon the above explanation of the first preferred embodiment shown in FIG. 1, that, when it is desired to output a voice warning signal, the control action provided by the microcomputer 8 switches all of the switching devices 12 over, so that production of entertainment sound signals from all of the four speakers 3a, 3b, 3c, and 3d is definitely stopped, and in this case the voice warning signal is outputted from all four of the speakers at the same time. Needless to say, such a method of providing a warning signal will have a powerful warning action upon the operator of the automobile. On the other hand, it may be considered as somewhat severe and abrupt.

Figure 3:
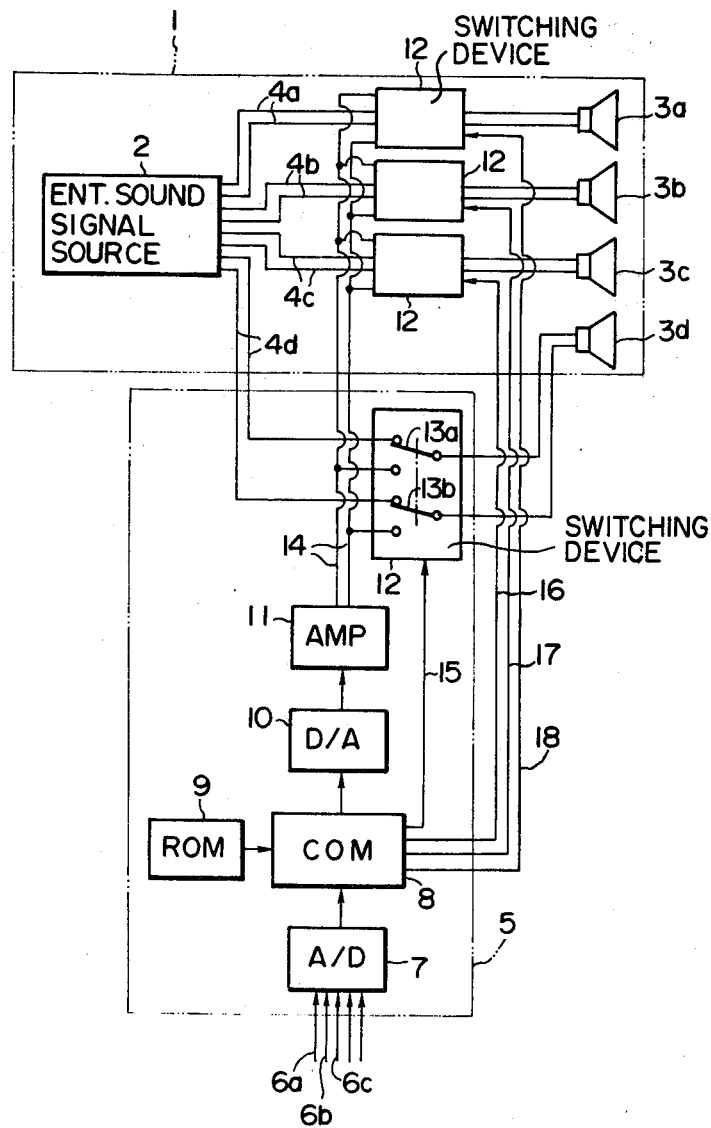
FIG. 3 is a view, similar to FIGS. 1 and 2, showing a third preferred embodiment of the present invention, in which the voice warning device is able to interrupt, selectively, one or more of the four speakers of an entertainment sound production system, according to the urgency of the warning message which it is required to produce.

In FIG. 3, a third preferred embodiment of the present invention is shown, which is somewhat more complicated than the first and second preferred embodiments shown in FIGS. 1 and 2. In this third preferred embodiment, four switching devices 12 are provided, as in the second embodiment shown in FIG. 2, but on the other hand these four switching devices 12 are independently controlled by the four switching signal wires, 15, 16, 17, and 18, which lead to them from the microcomputer 8. Accordingly, according to the program stored in the microcomputer 8 upon which it operates, it is possible to select one, two, three, or all four of the speakers 3a, 3b, 3c, and 3d for interruption of the entertainment sounds being emitted therefrom, and for production of the warning voice signal. Thus, when the switching devices for the various speakers are individually switchable, as in this embodiment, according to the judgement of the microcomputer 8, the number of speakers which are used for production of the voice warning signal may be varied according to the severity and urgency of the warning message. For example, if a door of the automobile is slightly ajar, which is not a very serious problem condition, then only one of the speakers need be used for production of the voice warning signal, but if on the other hand the oil pressure of the engine of the automobile has dropped to a critically low level while the engine is running, which is a very serious problem condition, then all of the speakers may be used for producing a positive and abrupt signal message to the operator of the automobile.

In the various figures representing the several embodiments, the same reference numerals have been used for corresponding parts which have like functions, in the interests of clearness of description.

Various modifications to the various details of the shown embodiments of the present invention are possible. For example, although the present invention is particularly suited to be applied to a voice warning device which uses a microcomputer for generating voice warning signals, this is not strictly necessary for the present invention, which could be used for a voice warning device wherein signals were stored upon various magnetic tapes. Other possible changes could be made; in fact, although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

We claim:

1. A voice warning device for a driver's compartment equipped with an entertainment sound production system comprising a plurality of speakers, an entertainment sound signal production device, and a plurality of electrical connections for conducting entertainment sound-bearing electric signals from the entertainment sound signal production device to said speakers;

said voice warning device, comprising:

a plurality of switching devices, each provided in one of said electrical connections between one of said speakers and said entertainment sound signal production device;

a warning voice sound signal production device, for selectively generating electric signals representing human voice sounds for conveying a warning; and, means for operating said switching devices such that all of said switching devices are automatically switched to transmit entertainment sound-bearing electric signals from said entertainment sound signal production device to their respective speakers when said warning voice sound signal production device is not generating electric signals, but, when said warning voice sound signal production device is generating electric signals, at least one of said switching devices is automatically switched from transmitting entertainment sound-bearing electric signals from said entertainment sound signal production device to its respective speaker to transmitting warning voice sound-bearing electric signals from said warning voice sound signal production device to said respective speaker;

said operating means automatically changing a number of said switching devices which transmit said warning voice sound-bearing electric signal to a respective speaker in accordance with a type of warning voice sound-bearing electric signal which is being produced so that said number is increased as the severity and urgency of the condition represented by the warning voice sound-bearing electric signal increases.

2. A voice warning device according to claim 1, wherein said operating means is part of said warning voice sound electric signal production device.

3. A voice warning device according to claim 2, wherein said warning voice sound electric signal production device comprises a memory for storing digital signals which represent warning voice sounds, a microcomputer for receiving digital signals from said memory and for outputting digital signals which directly represent warning voice sounds, and a D/A converter for receiving said output signals from said microcomputer and outputting analog electrical signals directly representing said warning voice sounds.

* * * * *